T. E. SHANNON.
Steam Plow.

No. 17,849.

Patented July 21, 1857.

UNITED STATES PATENT OFFICE.

THOS. E. SHANNON, OF WOODVILLE, MISSISSIPPI.

IMPROVEMENT IN COTTON AND CANE CULTIVATORS.

Specification forming part of Letters Patent No. 17,849, dated July 21, 1857.

*To all whom it may concern:*

Be it known that I, THOS. E. SHANNON, of Woodville, in the county of Wilkinson and State of Mississippi, have invented an Improvement in Cultivators for Cane and Cotton; and I do hereby declare that the following is a full, clear, and exact description of the principle or character which distinguishes it from all other things before known, and of the usual manner of making, modifying, and using the same, reference being had to the accompanying drawings, of which—

Figure 1:
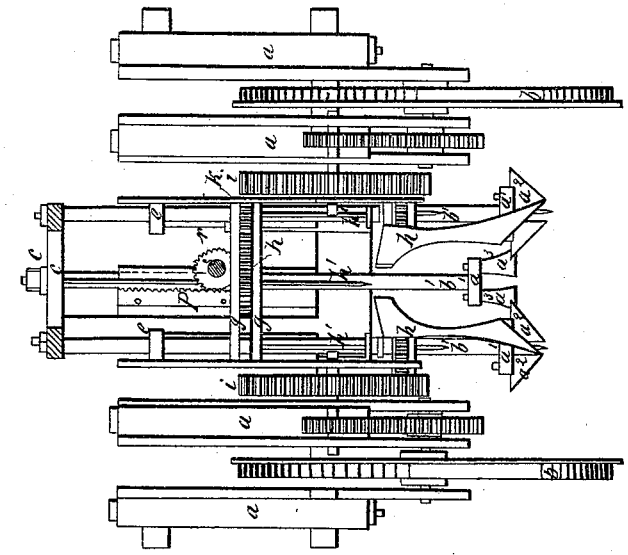
Figure 3:
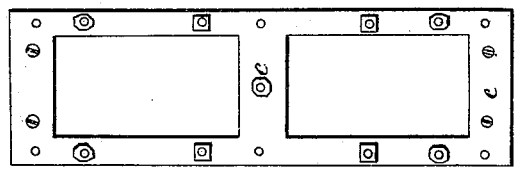
Figure 4:
Figure 2:
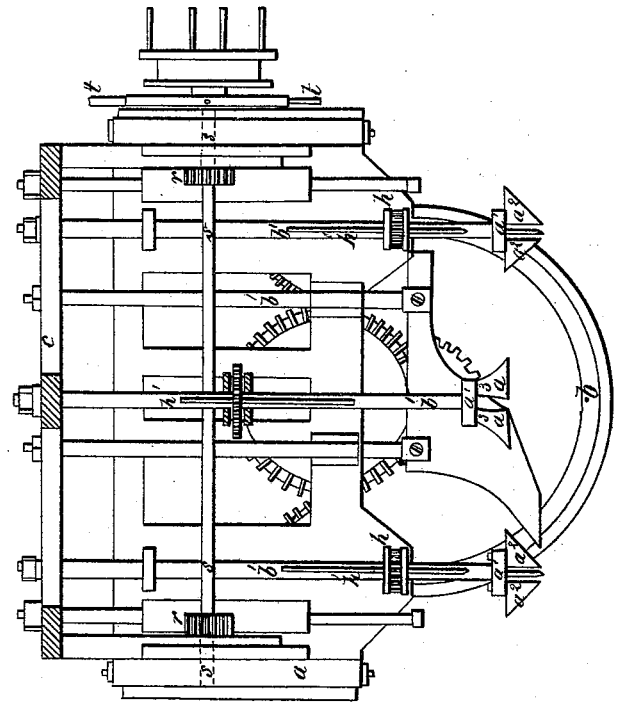

Figure 1 is a vertical longitudinal middle section of the machine; Fig. 2, a vertical middle cross-section; Fig. 3, a view of the top of the adjustable cultivator-frame, and Fig. 4 a cross-section through the pinions $h$ and shafts $b$.

My improvement in cultivators for cane and cotton consists in combining a series of revolving cutters with an adjustable frame-work, and in combination therewith an elevated central revolving cutter to pass over the drill and thin out the plants. For this purpose I construct a suitable carriage-frame, $a$, to form the bearings for the driving-wheels $b\ b$ and the support for the adjustable frame $c$. Connected with the frame are vertical rods $b'$—five in number, two in front, two in the rear, and one in the center of the machine. These rods are made to slide up and down through collars $e$ attached to the carriage frame-work, the central rod sliding in collars in the cross-beams $g\ g$. Upon the rods $b'\ b'$ are pinions $h\ h$. The pinions of the front and rear rods are driven by the side gearing of the wheels $i\ i$, and that of the central rod by one of these wheels by means of the intermediate gear, $k$. The rods slide loosely up and down through the pinions $h$, and a key, $n$, fast with the pinions projects inwardly within the grooves $h'$ to cause the rods to rotate with the pinions. The frame $c$ is adjusted up and down as follows: Attached to the adjustable frame are racks $p\ p$, into which the pinions $r\ r$ take, and these pinions are connected with the shaft $s\ s$, which has its bearings in the carriage-frame, and this shaft is turned by means of the arms $t\ t$ on the wheel $u$. As the pinion is turned it moves the rack and the adjustable frame and rods, so that the cultivators attached to the disks $a'$ on the bottom of the rods may be raised and lowered according to the depth they are required to work.

The cultivators on the front and rear rods consist of four triangular blades, $a^2$, arranged at right angles to each other, so that in revolving their outer edges describe a truncated conical figure. The cultivator of the central rod consists of two blades, $a^3$, of the form shown in Figs. 1 and 2, and are designed to cut out the young plants for the purpose of thinning the crop when sowed in drills. This central cutter may be raised up out of the way when not needed for use, or may be removed altogether from the machine.

What I claim as my invention is—

The combination, with a wheel-carriage, of a series or gang of revolving cultivators arranged and operated in the manner and for the purpose herein set forth.

THOS. E. SHANNON.

Witnesses:
CHAS. G. PAGE,
R. T. CAMPBELL.